United States Patent [19]
Kato et al.

[11] Patent Number: 5,432,935
[45] Date of Patent: Jul. 11, 1995

[54] EMULATION FOR EXECUTING A SECOND LANGUAGE APPLICATION PROGRAM ON A COMPUTER HAVING A FIRST LANGUAGE OPERATING SYSTEM

[75] Inventors: Hiroshi Kato, Hanno; Masamichi Wada; Satoshi Goda, both of Tokyo; Hideo Kasuya, Tokyo, all of Japan

[73] Assignee: Kabushiki Kaisha Toshiba, Tokyo, Japan

[21] Appl. No.: 799,334

[22] Filed: Nov. 27, 1991

[30] Foreign Application Priority Data

Nov. 27, 1990 [JP] Japan .................................. 2-324298
Feb. 27, 1991 [JP] Japan .................................. 3-031250

[51] Int. Cl.$^6$ ............................................. G06F 9/455
[52] U.S. Cl. ................................. 395/700; 395/650; 395/166; 395/115; 395/146; 395/150
[58] Field of Search ............... 395/700, 650, 166, 115, 395/146, 150

[56] References Cited

U.S. PATENT DOCUMENTS

| | | | |
|---|---|---|---|
| 4,428,065 | 1/1984 | Duvall et al. | 395/150 |
| 4,970,939 | 11/1990 | Diefendorf et al. | 395/700 |
| 5,050,103 | 9/1991 | Schiller et al. | 395/150 |
| 5,093,799 | 3/1992 | Horiguchi | 395/166 |
| 5,093,906 | 3/1992 | Crozier | 395/150 |
| 5,146,546 | 9/1992 | Neuhard et al. | 395/115 |
| 5,157,606 | 10/1992 | Nagashima | 395/146 |
| 5,175,811 | 12/1992 | Sone et al. | 395/166 |
| 5,179,700 | 1/1993 | Aihara et al. | 395/650 |

OTHER PUBLICATIONS

"Nikkei Byte". Dec. 1990, pp. 180–184.
Gerd Hildebrandt and Herbert Thiess, "Z80-Software läuft auf 68000-Systemen", Elektronik, vol. 34, No. 25, pp. 91–92 (Dec. 13, 1985).
I.E.E.E. Spectrum, "Making Your PC Behave Like Another", vol. 23, No. 10, pp. 61–66 (Oct. 1986).
Henry Nash, "The Design and Development of a Software Emulator", Spring COMPCON89, pp. 288–291, (Feb. 27–Mar. 3, 1989).

Primary Examiner—Parshotam S. Lall
Assistant Examiner—Timothy L. Philipp
Attorney, Agent, or Firm—Banner & Allegretti, Ltd.

[57] ABSTRACT

The present invention includes a first-language basic input/output control program linked with a first-language OS an a computer and an input/output device for executing first-language application software in object code form, an emulator linked with second-language application software, the first-language basic input/output control program and the first-language OS for executing the second-language application software in object code form and a way of activating and terminating the emulator. Thereby, there is provided a computer system which permits the first-language application software and the second-language application software to be operated using the identical computer, input/output device and first-language OS.

73 Claims, 11 Drawing Sheets

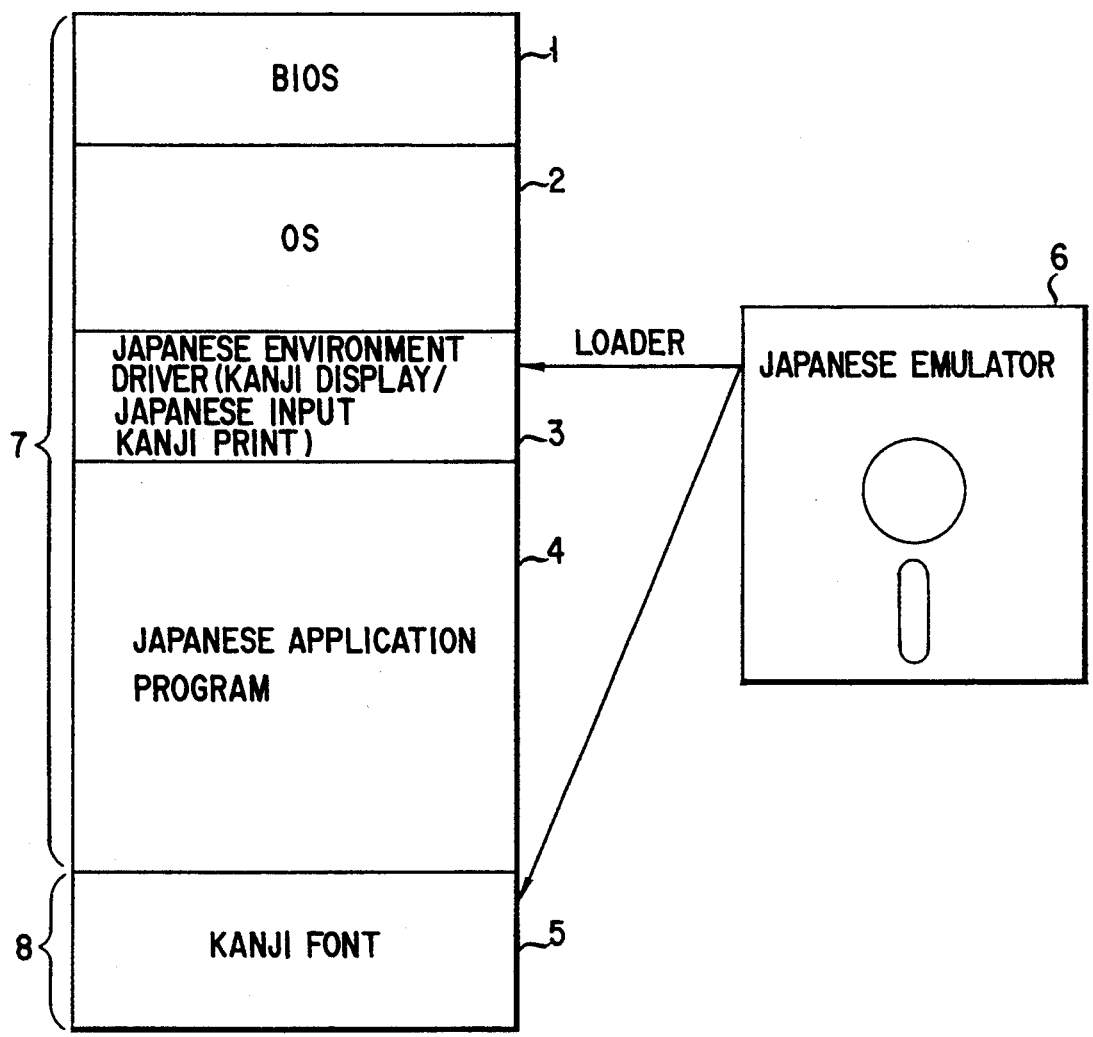
F I G. 3

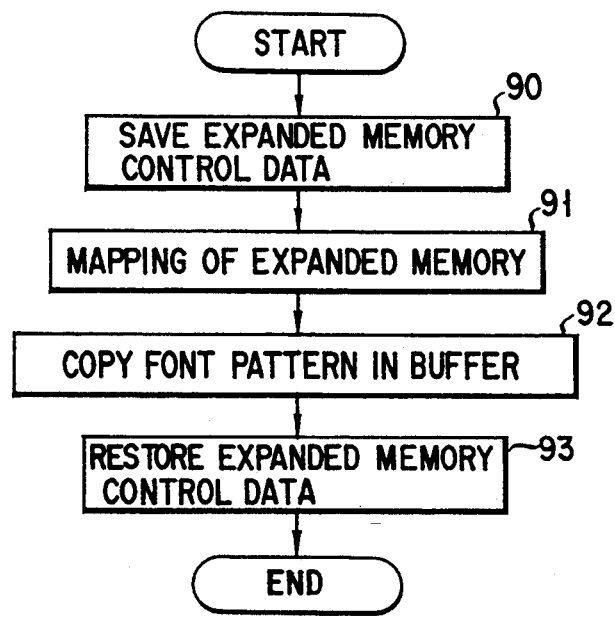
F I G. 13
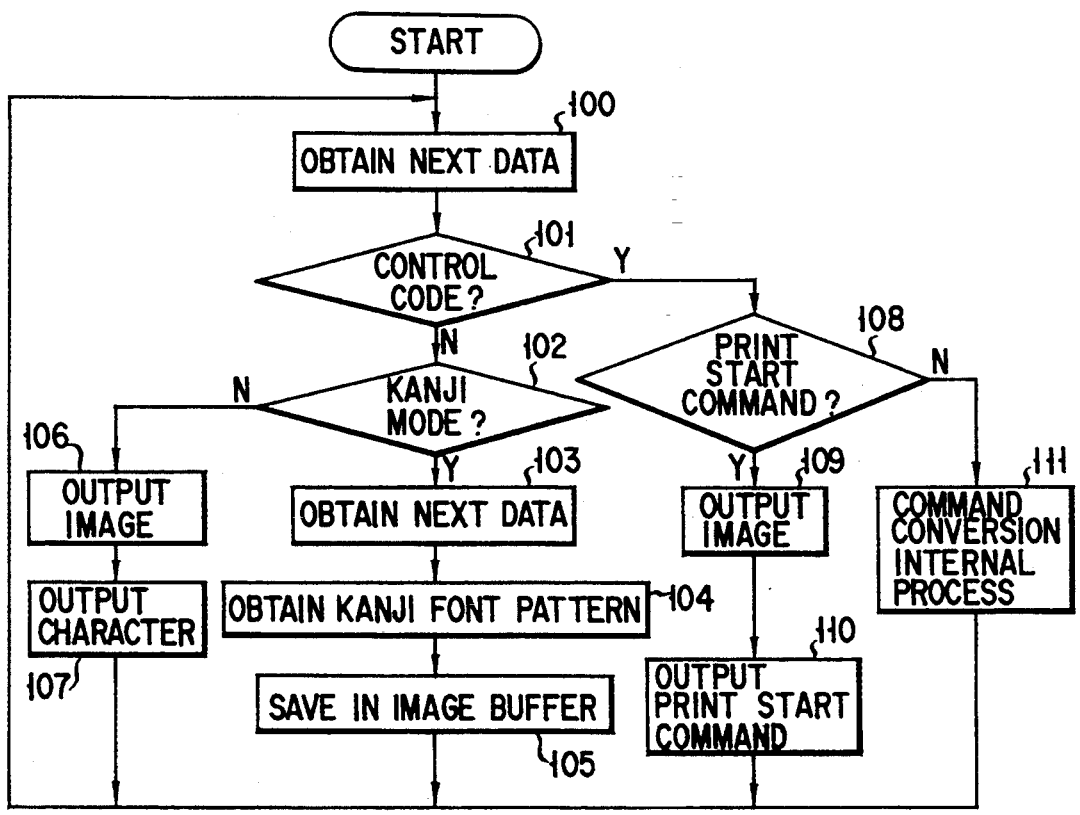
F I G. 14

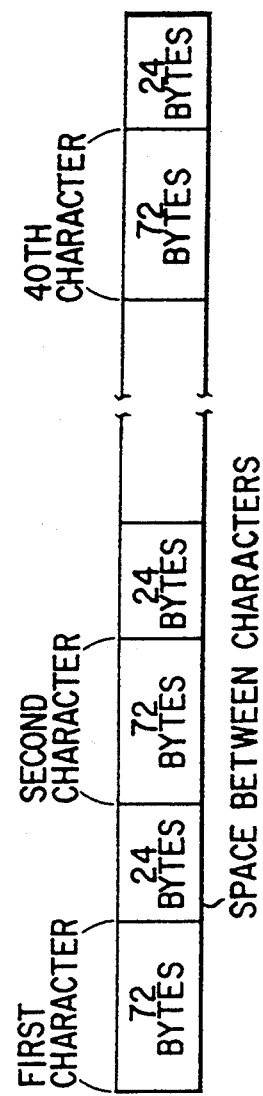
F I G. 16

EMULATION FOR EXECUTING A SECOND LANGUAGE APPLICATION PROGRAM ON A COMPUTER HAVING A FIRST LANGUAGE OPERATING SYSTEM

BACKGROUND OF THE INVENTION

1. Field of the Invention

The present invention relates to a computer system capable of operating both first-language application software and second-language application software utilizing one computer, one input/output device and one first-language OS, and more particularly to a computer system having an emulator for executing Japanese application software on a computer running under an English OS while maintaining a software interface for English application software and its emulator.

2. Description of the Related Art

Heretofore, a personal computer handling the Japanese language has had a unique architecture different from that of a personal computer handling English language and an operating system (hereinafter abbreviated OS) is also supplied in a Japanese-processing-facility added form.

However, personal computers for business use led by the United States of America extensively use the IBM-supplied PC/AT architecture. Several tens of thousands of pieces of excellent application software developed for the PC/AT architecture have been sold. For this reason, in the personal computer world, the PC/AT architecture has generally been recognized as the world standard, and thus personal computers of the same architecture have been manufactured and sold by many companies.

On the other hand, in order to realize the Japanese environment on the PC/AT architecture, the addition of hardware, such as a modified keyboard and a Kanji font ROM, have been required. Following this, modifications of the basic input/output system (BIOS) which is a basic input/output control program and the OS are required.

FIG. 1 is a block diagram of a system for utilizing English application software (hereinafter referred to as English application) with the English 10 MS-DOS prepared by Microsoft Corporation in U.S.A. Also, FIG. 2 is a block diagram of a system for utilizing Japanese application software (hereinafter referred to as Japanese application) with the Japanese MS-DOS. As is evident from the comparison of FIG. 1 with FIG. 2, in the case of personal computers handling Japanese applications, the Japanese MS-DOS (hereinafter referred to as the Japanese DOS) is provided in place of the English MS-DOS (hereinafter referred to as the English DOS) and the Japanese BIOS is newly provided.

To operate a Japanese application and English application on one personal computer, there is a method which uses two types of OSs, the Japanese DOS and English DOS.

According to this method, the OSs have only to be equipped with their respective facilities. From the standpoint of users, however, a drawback with the method is that operation is troublesome. That is, by way of example, in order to execute an English application after execution of a Japanese application, the English DOS has to be activated before the execution of the English application. There is also a drawback that two types of OSs have to be installed on a disk.

There is another method which incorporates an English-compatible facility into the Japanese OS. This method has an advantage that one OS permits Japanese and English applications to be operated, but on the other 10 hand the method has a drawback that a free area left for the English application is reduced in memory because a section for the Japanese facility is resident permanently in the memory. Moreover, since the DOS is not the English DOS proper, there is a drawback that there is not any guarantee that compatibility with the English DOS environment can be maintained. Furthermore, there is a drawback that the whole OS has to be looked over again for revision with each succeeding version of the OS.

In either of the two methods, no consideration is given to printers. That is, printers adapted for a Japanese must be used for Japanese application, while printers adapted for an English must be used for English application. This is very inconvenient.

SUMMARY OF THE INVENTION

It is an object of the present invention to provide a computer system which permits both of first-language and second-language applications to be operated utilizing one computer, one input/output device and one first-language OS, and more specifically an emulator which permits, for example, a Japanese-language (second language) application to be executed, as requested by the user, under, for example, the English-language (first language) OS.

It is another object of the present invention to provide an emulator which permits, for example, a Japanese application to be executed, as requested by user, under the English OS without any modification of the contents of the English OS.

It is still another object of the present invention to provide an emulator which permits automatic switching between its activation and termination according to a screen mode that an application requests.

It is a further object of the present invention to provide an emulator which permits its installation (loading)/cancellation (unloading) to be performed with an easy operation or automatically and dynamically so that a memory area for a English application is not decreased.

It is a still further object of the present invention to provide a Japanese emulator which emulates the Japanese environment easily for PC/AT-compatible keyboards.

It is another object of the present invention to provide a Japanese emulator which is permitted to have Japanese Kanji font patterns for display while using a standard extended memory managed by an English OS.

A further object of the present invention is to provide a printer emulator which permits an English printer having no Japanese facility to be used for printing out outputs of a Japanese application.

A still further object of the present invention is to provide a Japanese emulator which supervises country identification information and permits the information to be returned to a Japanese application which expects it.

According to the present invention, there is provided a computer system having a computer and an input and output unit, and capable of executing a first-language operating system for processing English or a first language having a character system high in similarity to English which is on the market, first-language application software which is on the market in an object code form linked with the first-language OS, a second-language OS for processing a second language having a character system having little similarity to the character system of the first language which is on the market, and a second-language application software which is on the market in an object code form linked with the second-language OS, comprising a first-language basic input/output control program linked with the first-language OS, the computer, and the I/O unit in order to execute the first-language application software in object code form, an emulator linked with the second-language application software, the first-language basic input/output control program, and the first-language OS in order to execute the second-language application software in object form, and means for activating and terminating the emulator.

According to the present invention, for example, a Japanese environment can be realized using a computer system based on an English OS without addition and modification of hardware. There is no need for worrying about compatibility with English applications because the Japanese environment can be realized without modification of the English OS. The users have only to install one OS, so that the burden of operations is reduced. The automatic switching between use and unuse of the emulator is permitted according to a screen mode requested by an application. An emulator can be realized which does not decrease a memory area for an English application because the installation/release of the emulator can be performed easily or automatically and dynamically. It is easy to emulate a Japanese environment for PC/AT-compatible keyboards. Japanese kanji font patterns for display are provided using a standard expanded memory managed by an English OS. Further, outputs of a Japanese application can be printed out by an English printer having no Japanese facility without the need of a Japanese printer.

The advantages of the present invention are as follows:

(1) Environments for other languages (Japanese, etc.) can be realized without modification of hardware of PC/AT compatibles.
(2) Compatibility with English applications is not lost because environments for other languages can be realized without modification of OS. The burden of installation is light because users have only to install one OS.
(3) The installation/release of the emulator can be performed easily or automatically and dynamically and thus a memory area for an English application is not decreased.
(4) A screen mode of automatic permits determenation of wheter the English OS or Japanese emulator is operating. Both English and Japanese applications can be executed by the Japanese emulator.
(5) Outputs of a Japanese application can be printed out by an English printer without the need of a Japanese printer.
(6) Existing applications can be executed without any modification or with minimum modification because an existing application interface is maintained.
(7) The keyboard of PC/AT compatibles can realize a Japanese environment easily by using a key which is never or seldom used by an application as a kana key and a combination of the key and another key as a kanji conversion key.
(8) Kanji font patterns can be stored using a standard expanded memory managed by the OS. This permits Kanji to be displayed easily without worrying about memory capacity.
(9) Each of the kanji font patterns is stored turned by 90 degrees beforehand in the printer emulator. Thus, the font patterns can be output at high speed without performing pattern conversion.
(10) In response to a request for country identification information from a Japanese application the Japanese emulator returns information of "Japan" to the application in spite of use of an English DOS. Thereby, the Japanese application can run properly.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram illustrating the whole concept of the present invention;

FIG. 13 is a flowchart for the Kanji font pattern acquisition processing by the display driver of the present invention;

FIG. 14 is a flowchart for the processing by the printer emulator-of the present invention;

FIG. 16 illustrates the row printing control image buffer of the printer emulator of the present invention.

DETAILED DESCRIPTION OF THE PREFERRED EMBODIMENTS

Figure 1:
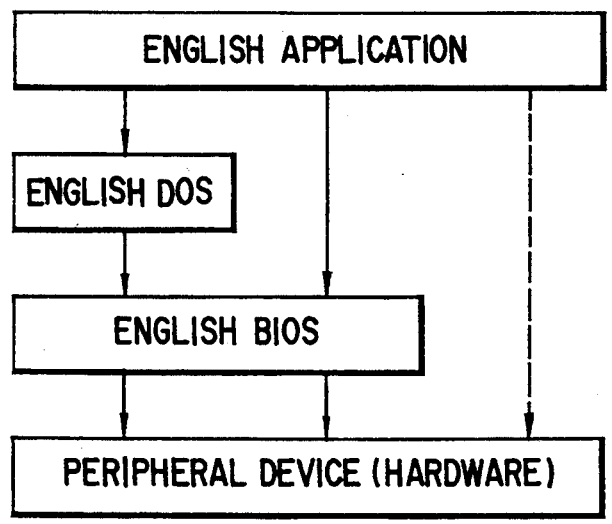
FIG. 1 is a block diagram illustrating the concept of utilization of a conventional English application.

Hereinafter, an embodiment of the present invention will be described with reference to the accompanying drawings. In the following description, Japanese is taken as an example of the second language.

Referring now to FIG. 3, which illustrates the concept of the present invention, a BIOS 1 inherently performs input/output control for English processing. An OS 2 manages system resources, such as hardware and software, as well as input/output devices connected to the system by utilizing BIOS 1. A Japanese environment driver 3 includes various types of drivers for Kanji display, Japanese entry (conversion to Kanji codes), Kanji printing, etc. A Japanese application 4 implements a function of processing Japanese documents (word processing). BIOS 1, OS 2, Japanese environment driver 3 and Japanese application 4 are stored in main storage 7. Kanji font information 5, which is Japanese character pattern information utilized for displaying Kanji, is stored in expanded storage 8. A Japanese emulator 6 is a system disk comprising a set of a Japanese environment driver, Kanji font information and a loader. The loader permits the Japanese environment driver 3 and the Kanji font information 5 to be loaded into main storage 7 and expanded storage 8. The above configuration will be detailed below.

Figure 2:
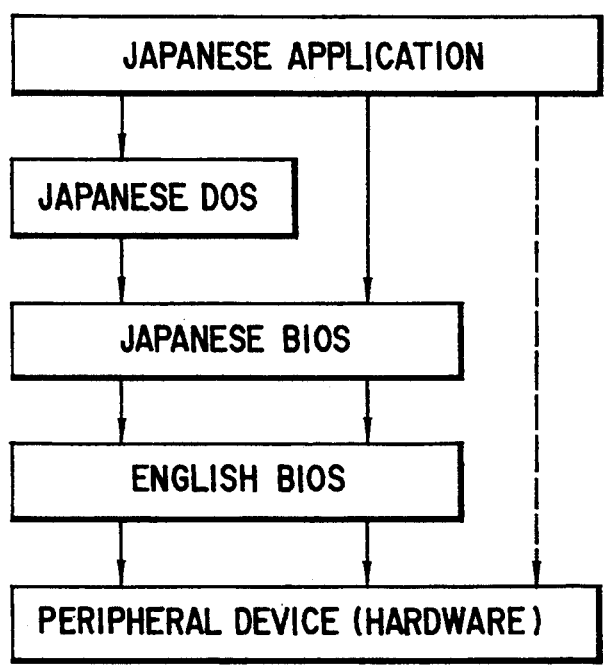
FIG. 2 is a block diagram illustrating the concept of utilization of a conventional Japanese application.
Figure 4:
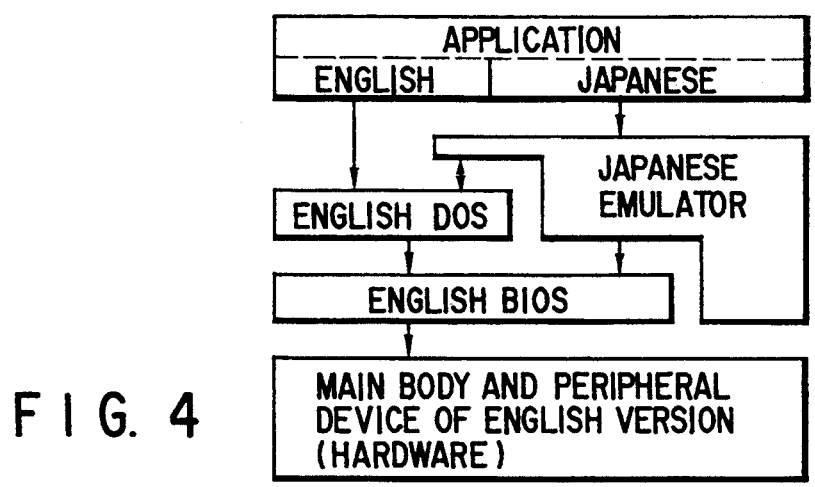
FIG. 4 is a block diagram illustrating the concept in which an emulator of the present invention is incorporated into a computer to utilize Japanese applications.

FIG. 4 is a block diagram in the case where a Japanese emulator is built into a PC/AT-compatible personal computer to utilize Japanese applications. That is, as is evident from the comparison of FIG. 4 with FIGS. 1 and 2, the Japanese emulator of the present invention has a function of emulating parts of the Japanese BIOS and Japanese DOS.

Figure 5:
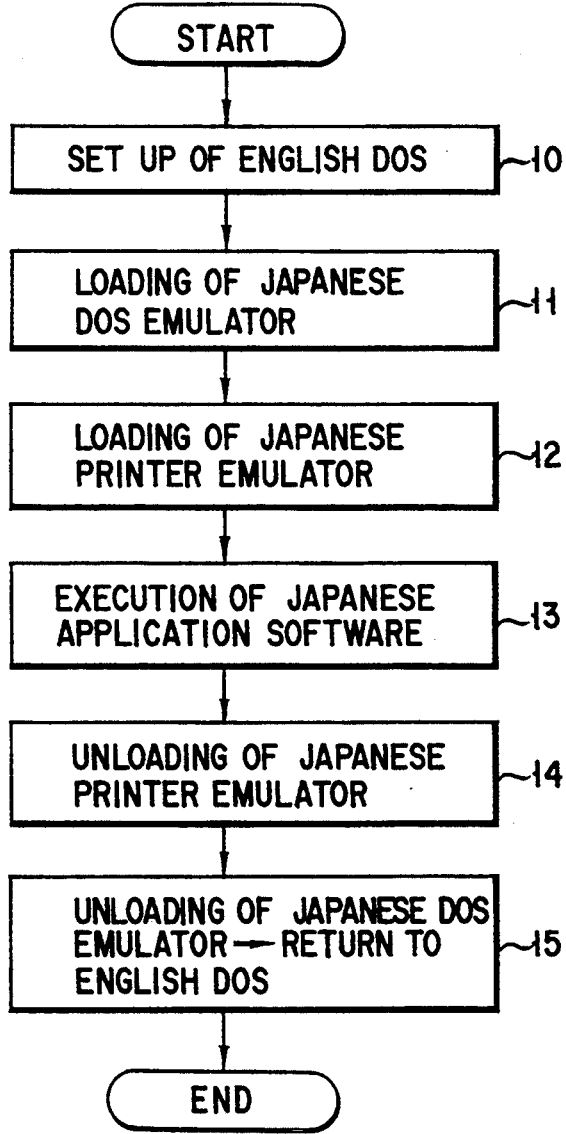
FIG. 5 is a flowchart illustrating the whole procedure for executing a Japanese application using the present invention.

FIG. 5 is a flowchart illustrating the whole procedure of executing a Japanese application using the present invention. After the activation of the system, a process of booting of the English DOS is first performed in step 10. Next, loading of the Japanese DOS emulator is executed in step 11. Subsequently, loading of the Japanese printer emulator is executed in step 12. Next, a desired Japanese application is executed in step 13. On termination of the execution of the Japanese application the Japanese printer emulator is unloaded in step 14 and then the Japanese DOS emulator is unloaded in step 15. On termination of the unloading of the Japanese DOS emulator the computer system returns to the English DOS mode.

Figure 6:
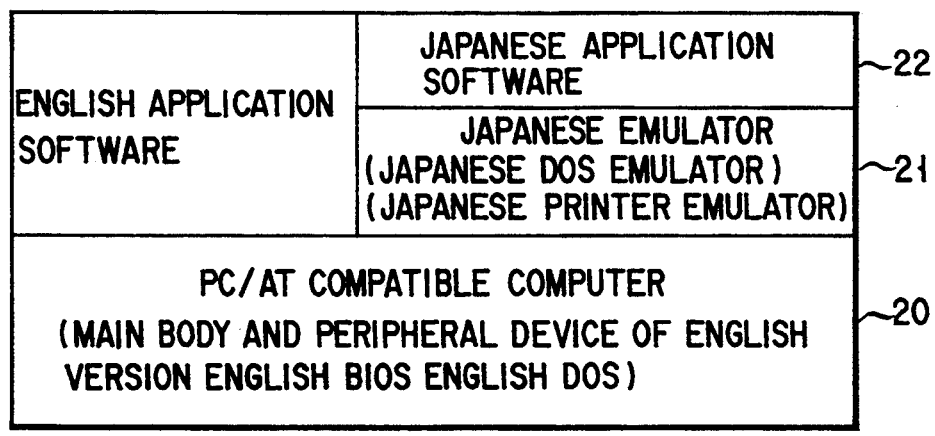
FIG. 6 is a block diagram illustrating the basic configuration of the present invention.

FIG. 6 illustrates the basic configuration of the present invention. Japanese emulator 21 of the present invention is loaded into and unloaded from a PC/AT-compatible personal computer 20 carrying an English DOS as its OS. A Japanese application 22 is executed on the PC/AT-compatible personal computer 20 by means of the Japanese emulator 21. Of course, the personal computer 20 can also execute English applications.

Figure 7:
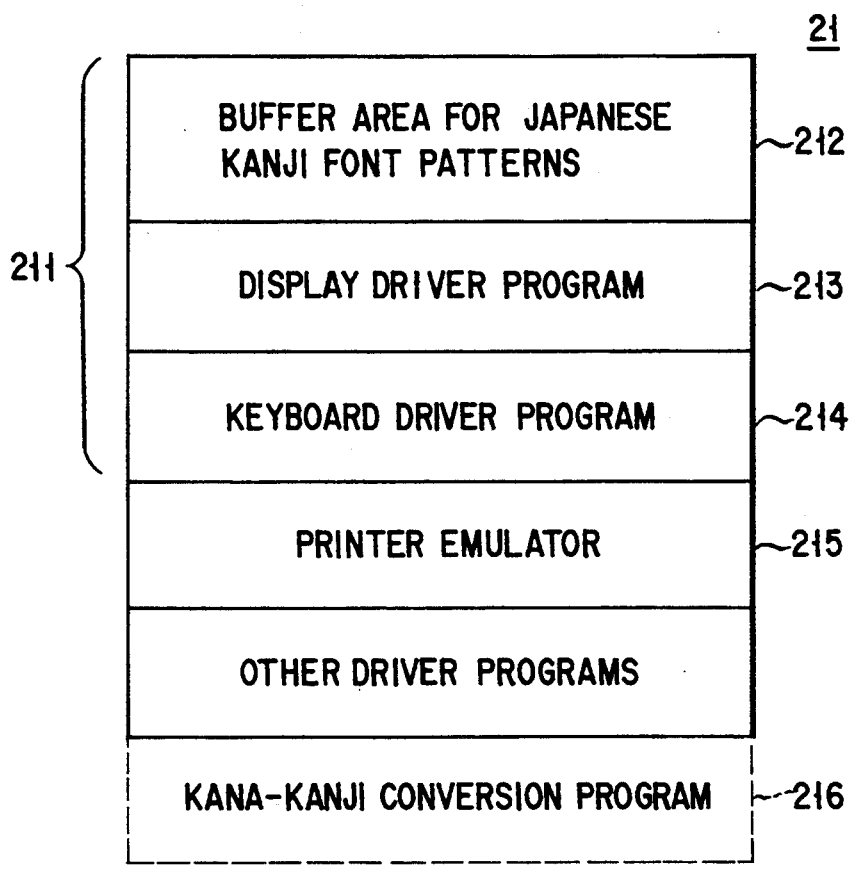
FIG. 7 illustrates the configuration of a Japanese emulator program of the present invention.

FIG. 7 illustrates a program configuration of the Japanese emulator of the present invention. The Japanese emulator 21 includes a Japanese DOS emulator 211 and a Japanese printer emulator 215. Further, the Japanese DOS emulator 211 includes a buffer area 212 into which Japanese font patterns are read into, a display driver program (hereinafter referred to as display driver) 213 and a keyboard driver program (hereinafter referred to as keyboard driver) 214. Other programs will be described later. As an option, the Japanese emulator 21 may carry a Kana-to-Kanji conversion program 216. In the present embodiment, use is made of a Kana-to-Kanji conversion program known by the trade name "ATOK" from the Just System Company, which has widely been used with the Japanese DOS.

Figure 8:
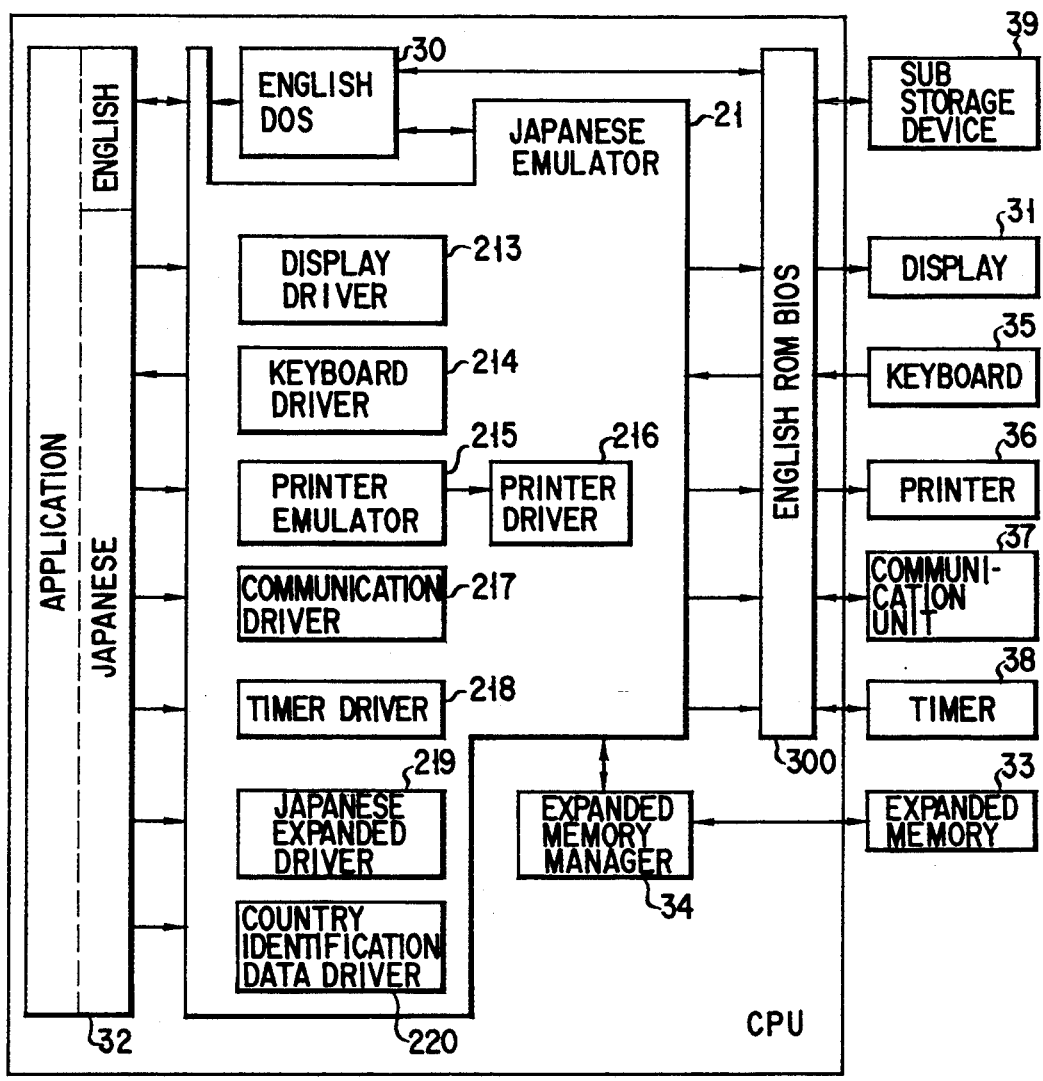
FIG. 8 is a diagram illustrating a system configuration in which a Japanese emulator is loaded into a memory of a personal computer to which the present invention is applied and its associated peripheral devices.

FIG. 8 illustrates the configuration of a personal computer to which the present invention is applied and whose CPU memory is loaded with the emulator of the present invention and its associated input/output devices. The Japanese emulator 21 is equipped with a display driver 213 having a Japanese processing function, a keyboard driver 214, a printer driver 216, a communication driver 217, a timer driver 218, a Japanese expanded driver 219, a country identification information driver 220 and a printer emulator 215 for emulating a Japanese printer function on an English DOS 30 (logically they are "on" the DOS, but they are shown at the left of the DOS in FIG. 8), thereby realizing the Japanese environment. Reading, activating or stopping and releasing of the Japanese emulator 21 can be specified by an operation in a command accepting state when the English DOS is operating. For this reason, it is designed so as not to affect memory capacity and compatibility for English applications.

The display driver 213 provides a screen mode which permits Japanese to be displayed on the display 31 and controls basic input/output operations for the display screen. Particularly, the display driver 213 supervises the screen mode so that an existing English application 32 can be executed even in the state in which the Japanese emulator 21 is resident in the memory. Thereby, the Japanese emulator 21 can be stopped in the screen mode for an English application. The available memory area cannot be expanded only by stopping the Japanese emulator, but the memory area can be expanded by performing the above-mentioned release operation as needed. The Japanese Kanji font patterns are stored in the expanded memory 33. To display Kanji on the screen, an expanded memory manager 34, which operates with the English DOS standard EMS (Expanded Memory Specification) system, is used to obtain Kanji font patterns from the expanded memory 33. Thereby, font patterns can be obtained at high speed without reducing the memory capacity for the application 32. The interface between the application 32 and the display driver 213 is compatible with the existing Japanese application interface.

The keyboard driver 214 manages hardware scan and character codes presented to the application 32 on the basis of scan codes generated from the keyboard 35. Physical differences between a Japanese keyboard and an English keyboard can be absorbed within the driver 214. The interface between the application 32 and the keyboard driver 214 is compatible with the existing Japanese application interface.

The printer driver 216, the communication driver 17 and the timer driver 218 are driver programs for controlling a printer 36, a communication unit 37 and a timer 38, respectively. The interface between the application 32 and each of the drivers 216, 217 and 218 is compatible with the existing Japanese application.

The Japanese expanded driver 219 is a driver for performing processing dedicated to the Japanese DOS and Japanese application 32 in particular and absorbs a portion derived from the difference in hardware, such as Kanji font information. The interface between the driver 219 and the application 32 is also compatible with the existing Japanese application interface.

The country identification information driver 220 is responsive to country identification information from the Japanese application 32 to return country identification information on Japan, while the English DOS returns country identification information on a country such as United States of America. The interface between the application 32 and the driver 20 is compatible with the existing Japanese application.

The printer emulator 215 performs emulation for replacing a request for Japanese printer made by the Japanese application 32 with a request to the printer 6. The emulator 215 enables the printer 36 having no Japanese facility to print Japanese characters without any modification of the Japanese application 32. An English ROM BIOS 300 performs basic input/output control on various types of peripheral devices 31 and 35–39 in the environment of the English DOS 30. The English ROM BIOS 300 has no Japanese processing facility. When the Japanese emulator 21 executes the emulation, a language-independent portion of the English ROM BIOS 300 operates.

The expanded memory manager 34 provides control of the expanded memory 33 using a system known to those skilled in the art by the name of EMS. The Japanese emulator 21 reads Kanji font patterns stored in part of the expanded memory 33 utilizing this function. An auxiliary storage device 39 is used as external storage. The display 31 displays characters, graphs, etc. The keyboard 35 is used to enter characters, data, etc., into the computer. The printer 36 prints characters, graphs, etc. In the present embodiment this is an English printer with no Japanese font pattern ROM. The timer 38 generates interruptions regularly and is used for time management. The expanded memory 33 is managed by the expanded memory manager 34 and stores Japanese Kanji font patterns in the case of the Japanese emulator. The application 32 contains a Japanese application and an English application. Both of them are operable depending on whether or not the Japanese emulator is utilized. The English DOS 30 is an OS containing functions such as memory management, file system, etc., but it has no Japanese processing facility.

Figure 9:
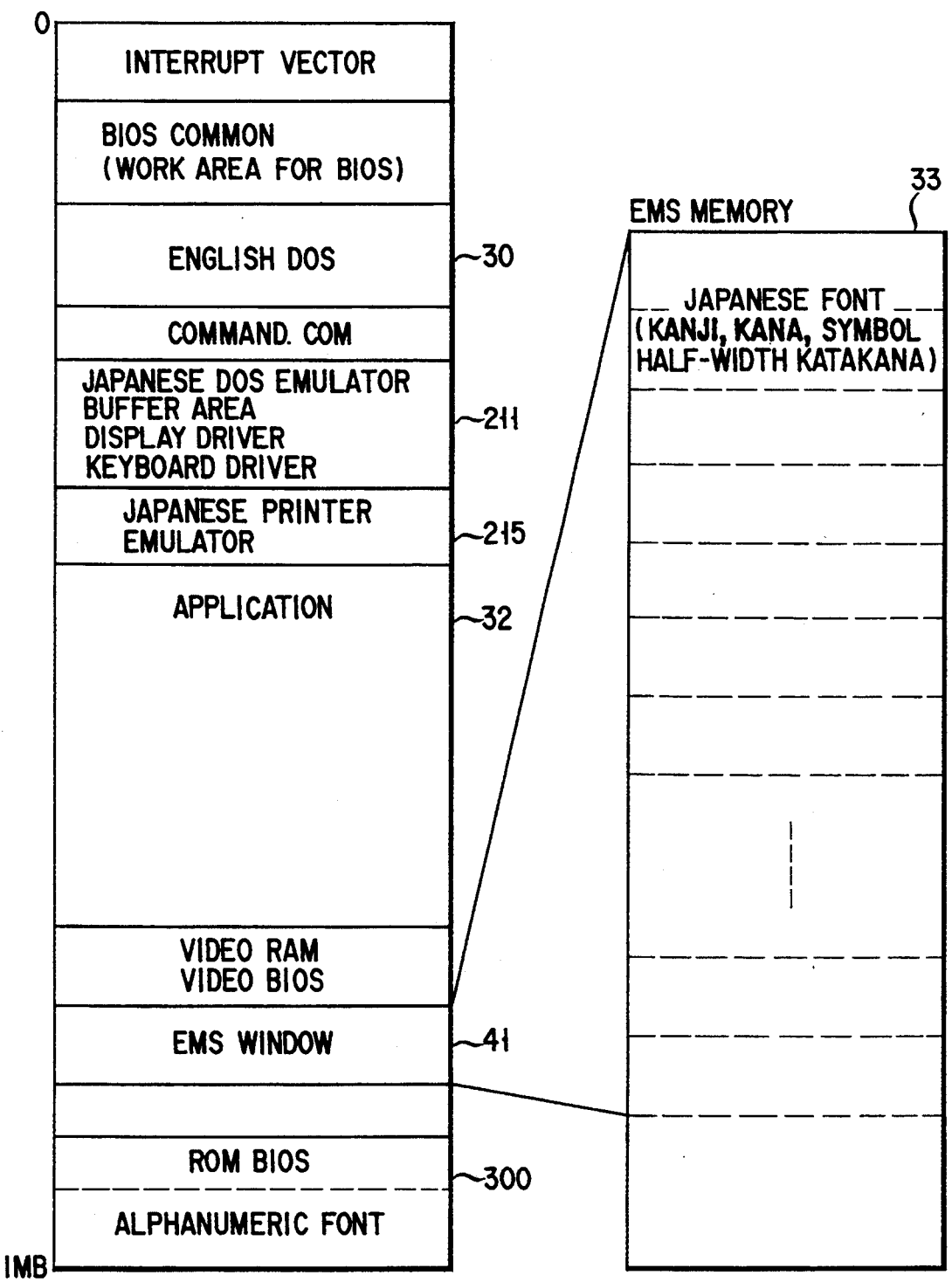
FIG. 9 is a diagram illustrating a state in which a Japanese emulator of the present invention is developed on a memory map.

FIG. 9 illustrates a state in which the Japanese emulator shown in FIG. 8 is further developed in the CPU memory map. When the Japanese emulator of the present invention is loaded into the main memory 40 of the CPU, the Japanese DOS emulator 211 and the Japanese printer emulator 213 are stored. The Kanji font patterns are stored in the EMS type expanded memory 33 managed by an expanded memory window 41.

Figure 10:
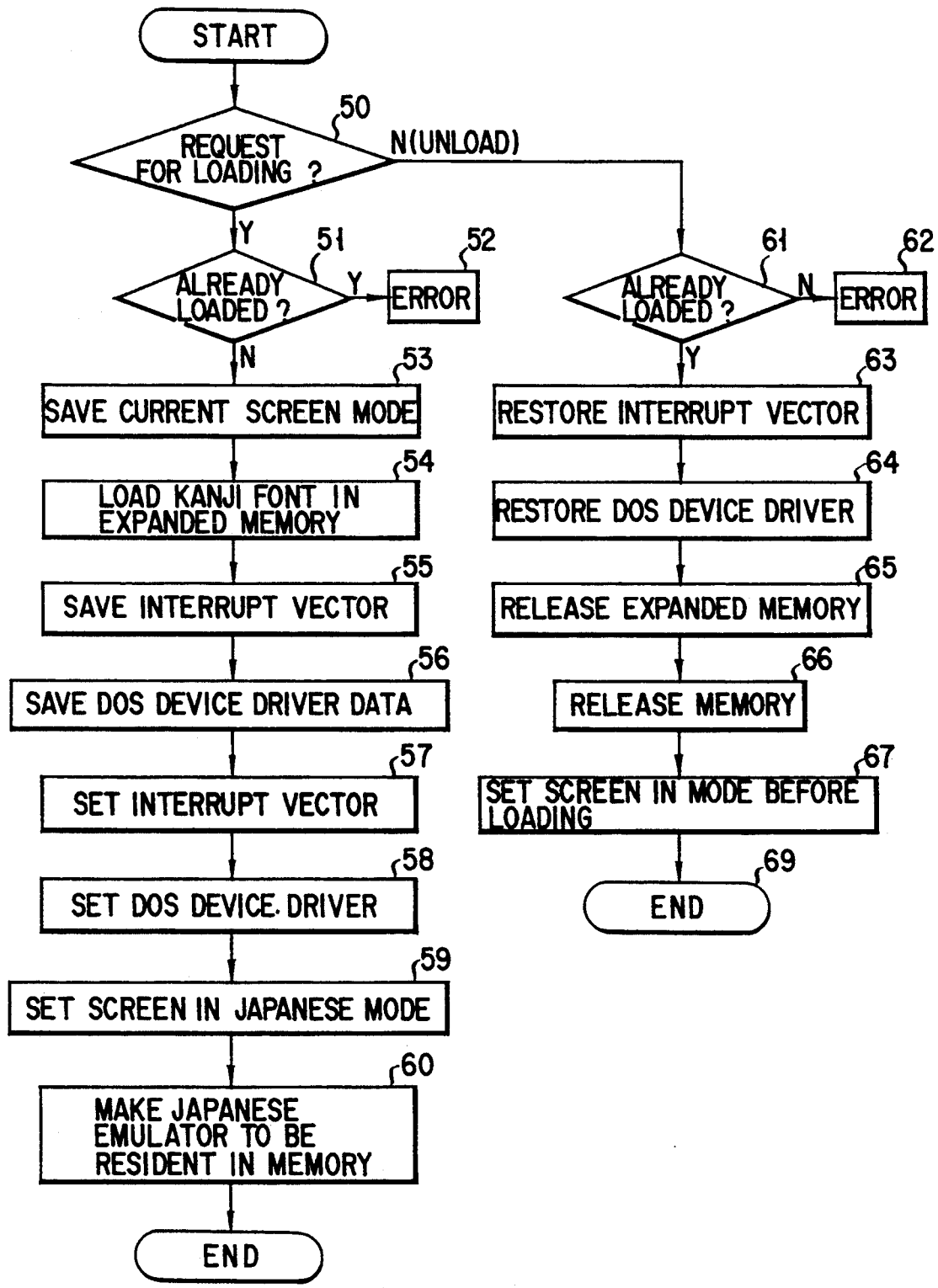
FIG. 10 is a flowchart of the operation for installing the Japanese emulator of the present invention into and releasing it from PC/AT compatibles.

Next, the operation of the CPU executing the Japanese emulator of the present invention will be described in detail with reference to FIG. 4 through 14.
(1) Loading and unloading of the Japanese emulator FIG. 10 is a flowchart illustrating processes of loading the Japanese emulator of the present invention into and unloading it from the main memory of a PC/AT-compatible machine.

The loading or unloading of the Japanese emulator 21 can be specified in a command accepting state where the English DOS 30 is operative. First, a check is made in step 50, as to whether or not a request is made for loading or releasing of the Japanese emulator 21. For the request for loading, a check is made in step 51 as to whether or not the Japanese emulator has been loaded. Where the Japanese emulator has already been loaded, an error message is presented to an operator in step 52. Where the emulator has not been loaded, on the other hand, the current screen mode is saved in work memory (not shown) in step 53. Next, Kanji font patterns are loaded into the expanded memory 33 in step 54. Next, interrupt vector information is saved in step 55. Also, DOS device driver information is saved in step 56. Subsequently, interrupt vectors for the Japanese BIOS emulator, the Japanese DOS emulator and the printer emulator are set in step 57 and a device driver is set in step 58. Finally, in order to execute the Japanese application, the display screen mode is changed to the Japanese mode in step 59 and the Japanese emulator is made to reside in the memory in step 60.

For the request for unloading of the Japanese emulator 21, a check is first made in step 61 as to whether or not the emulator has already been loaded. Where it has not been loaded, an error message is presented to the operator in step 62. Where it has been loaded, interrupt vector information and DOS device driver information saved at the time of the loading of the emulator are restored in steps 63 and 64. Then, the expanded memory 33 is released and the memory occupied in step 60 is released in steps 65 and 66. Finally, the screen mode is returned to the mode prior to the loading of the emulator in step 67 and the process is terminated in step 68. The foregoing process permits a Japanese emulator that can be loaded and unloaded to be realized.
(2) Japanese BIOS emulator section The Japanese BIOS emulator section is a function which emulates the Japanese BIOS section in the Japanese DOS environment. In the following description, a description will be given of the features of the keyboard driver and the display driver realized by the present invention on the keyboard and the Kanji font ROM which need addition or modification in realizing the Japanese environment in PC/AT-compatible machines. As processing for other devices the Japanese BIOS processing can be used as it is. The Japanese BIOS has been built in Toshiba laptop computers J3100 Series for Japan and many other domestic personal computers and known to those skilled in the art. Thus, a description of the Japanese BIOS is omitted herein.
2-1 Keyboard driver The keyboard driver 214 stores a scan code generated from the keyboard 35 and a character code generated according to the current shift state in a keyboard buffer (not shown) and transfers the buffered code to the application 32 or the English DOS 30 as requested by the application 32 or the English DOS 30.

The Japanese keyboard is equipped with a plurality of dedicated keys (for example, a Kana key, a Kanji conversion key, etc.) for reasons of direct entry of Kana characters and kana-to-Kanji and Roman-alphabet-to-Kanji conversion. On the other hand, PC/AT compatibles, having no dedicated keys,, must emulate a kana key for switching kana shift states and a kanji conversion key for reading a kana-to-kanji conversion program on a keyboard that is not in existence physically. For this reason, the present invention emulates the two keys with keys that are present on the keyboard of the PC/AT compatibles and seldom or never used by any Japanese application. By way of example, the Scroll Lock key may be used to emulate the kana key. Simultaneous pressing of the Alt key and the Scroll Lock key may be used to emulate the kanji conversion key. Conversely, the Scroll Lock key may be used to emulate the kanji conversion key and the simultaneous pressing of the Alt key and the Scroll Lock key may be used to emulate the kana key.

Figure 11:
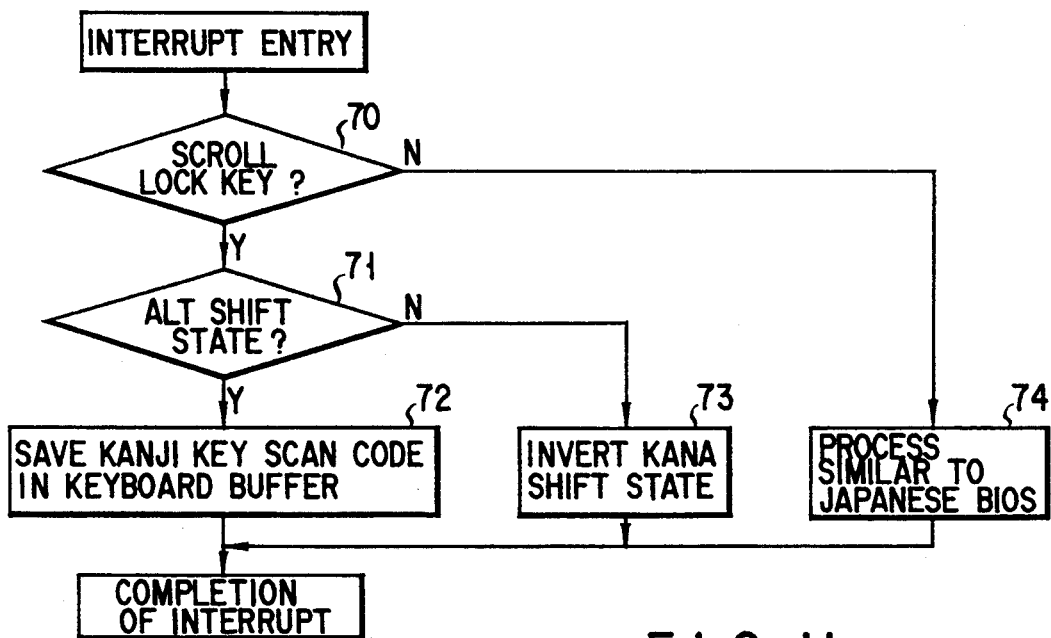
FIG. 11 is a flowchart illustrating the processing by the keyboard driver of the present invention for keyboard interrupt control.

FIG. 11 is a flowchart for the emulation processing in the keyboard interrupt control. First, a check is made in step 70 as to whether or not a key generated by the keyboard is the Scroll Lock key. In the case of the Scroll Lock key, a check is next made for the presence of the Alt key shift state in step 71. In the case of the Alt key shift state where the Alt key and the Scroll Lock key are pressed simultaneously, in step 72, the scan code of the kanji conversion key defined by the Japanese BIOS is saved in the keyboard buffer (not shown) without using the scan code of the Scroll Lock key. Where it is not the Alt key shift state, on the other hand, only the Scroll Lock key is pressed and thus this state is regarded as the kana key, so that the kana shift state is reversed in step 72. When a key pressed is not the Scroll Lock key, the same processing as in the Japanese BIOS is performed in step 74, so that a suitable character code is stored in the keyboard buffer according to each shift state. The above operations are carried out repeatedly with each key entry.

2-2 Display driver

The display driver 213 provides not only a function of displaying Japanese on the display 31 but also a function of rendering all the Japanese emulation on or off in response to a screen mode setting request from the application. The PC/AT compatibles have no kanji font ROM. In the present invention, therefore, in order to display kanji, the display driver 213 executes processes of managing kanji fonts stored in the expanded memory 33 via the expanded memory manager 34 and spreading them on the screen.

2-2-1 Changing from Japanese to English or from English to Japanese by switching between screen modes (automatic decision)

Figure 12:
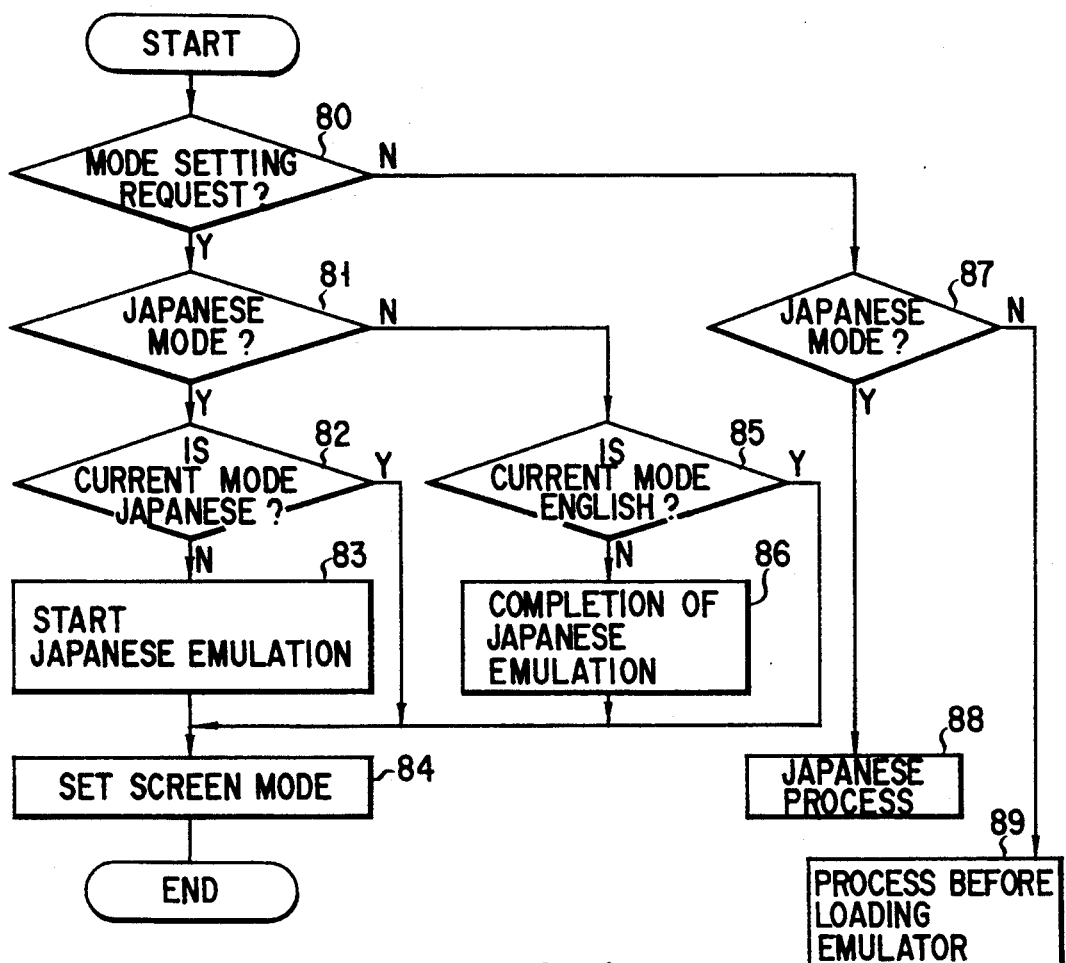
FIG. 12 is a flowchart for screen mode automatic decision processing by the display driver of the present invention.

FIG. 12 is a flowchart illustrating a screen mode automatic decision process of the display driver 213.

First, a check is made in step 80 as to whether or not a request made to the display driver 213 is a screen mode setting request. In the case of the screen mode setting mode, in subsequent step 81, a check is made as to whether or not the request is made for setting the Japanese mode. In the case of the Japanese mode setting request, a check is next made in step 82 as to whether or not the current screen mode is the Japanese mode. When it is not the Japanese mode, the Japanese emulator is activated in step 83. Subsequently, the screen mode is set to the Japanese mode in step 84.

When the request is not made for setting the Japanese mode, in other words, when the request is made for setting the English mode, a check is made in step 85 as to whether or not the current screen mode is the English mode. When the screen mode is not the English mode (i.e., when it is the Japanese mode), the Japanese emulator is stopped in step 86. At the time of the activating/stopping of the Japanese emulator, the setting/restoration of the interrupt vector and the setting/restoration of the DOS device driver described in connection with FIG. 10 are performed. That is, the Japanese emulator is activated or stopped automatically as it is resident in the memory 40. Of course, the emulator may be switched semiautomatically through the intervention of a simple operation for obtaining verification by the operator. This modification is easy. After the screen mode has been changed to the English mode, only the screen mode automatic decision process is operative.

For requests other than the mode setting request, a check is made in step 87 as to whether or not the current mode is the Japanese mode. In the case of the Japanese mode, a process corresponding to the Japanese BIOS is performed in step 88. In the case of the English mode, on the other hand, the process prior to loading of the Japanese emulator is executed in step 89.

FIG. 12 illustrates the method of switching between activation and termination of the emulator in response to a screen mode setting request made by an application. Alternatively, the emulator may also be switched in such a way that it is activated in response to the Japanese screen mode setting request made by an application and stopped in response to termination of the requesting application. Further, the emulator may be controlled in such a way that it is stopped in response to a request for a screen mode other than Japanese mode made by an application and activated in response to termination of the requesting application.

If the reading into the memory and releasing thereof described in connection with FIG. 10 are performed simultaneously with the setting and restoring of the interrupt vector and the DOS device driver, the loading and unloading of the emulator will be performed automatically and dynamically. It is also easy to perform the loading and unloading of the emulator semiautomatically through the intervention of a simple operation for obtaining operator verification.

2-2-2 Kanji font pattern processing

The display driver 213 has a function of displaying kanji on the display screen, while PC/AT compatibles have no kanji ROM. Thus, there is a need for some method of acquiring kanji font patterns and spreading them on the screen. With Toshiba J3100 Series PCs, a separate kanji font ROM is so prepared that an area of the memory 40 is not occupied by kanji font patterns. The kanji font ROM is separated into 16 banks in 64 KB units. The ROM is controlled such that one of the 16 banks looks from the addressing facility of the memory 40 as if it were copied into a 64-KB fixed address area that is a part of the memory 40. For example, where the OS or application wants to use a font pattern included in the third bank of the 16 banks, an instruction to write information of 3 into an arbitrary address in the 64-KB fixed address area is executed. By this operation hardware control is performed as if the third bank were copied into the 64-KB fixed address area. Thus, the OS or application can use an instruction to read information from the 64 K bytes to obtain a desired font pattern. It is required to pay attention to the fact that the write instruction is executed in the neighborhood of the font patterns because of such a configuration. When the font patterns are stored in a ROM, there is no ground for anxiety because the ROM cannot be written into. In the emulator, etc., where the font patterns are stored in any other place than the ROM, there is a fear that write instructions will destroy the font patterns.

Where the OS or application needs font patterns, a specific command defined by the OS is usually issued to execute deduction. That is, an interruption is generated from a hardware standpoint and an interruption handling program examines attendant information to learn that it is a request for font pattern and transfers control to a program for reading font patterns. The font pattern reading program advances processing using such a procedure as described above. However, the application may infrequently advance processing using the above procedure instead of execution of deduction using a specific command as described above, rendering the way of making the emulator difficult.

In the present invention, font patterns are stored in the expanded memory 33 which is also called the EMS memory. The expanded memory 33 is a memory area open to the OS and applications. In addition to the font patterns, programs and data related to the OS and applications may be stored in the expanded memory. The expanded memory 33 comprises a plurality of banks in 16-K units. The expanded memory addressing is performed using a bank number, or a page number and an offset representing an address in a bank. In response to the expanded memory addressing, the expanded memory manager 34 writes into and reads from a specific address in the expanded memory. For example, when a page number of 3 is designated, hardware control is performed as if the third bank of the expanded memory were copied into a specific address area of 16 K bytes, or the EMS window 41 in the memory 40. When an instruction to write into or read from a specific address of the EMS window 41 is designated by an offset, writing into or reading from the offset address of the bank of the expanded memory 33 is performed actually.

The control system of the font pattern ROM and the expanded memory described in the above three paragraphs is the basic technique that the present invention employs, but it does not constitute a newly devised part of the present invention and is well known to those skilled in the art.

In the present invention, font patterns are stored in 64 K bytes of each of the banks of the expanded memory 33. FIG. 13 is a flowchart for the font pattern acquiring process. As a result of deduction of the font pattern reading request as described above, the font pattern acquiring process of FIG. 13 starts. First, in step 90, information about control of the expanded memory such as the number of a bank used so far is saved in a specific address of the memory 40. In subsequent step 91, a bank containing a desired font pattern is page-designated so that it is visible to the EMS window 41. In subsequent step 92, 16-KB font pattern information visible to the EMS window is copied into the buffer area 212 for Japanese font patterns prepared in the Japanese DOS emulator 211.

The reason for using the font pattern information after being copied into the buffer 212 as described above without using it as it is visible to the EMS window is that there is a possibility that a write instruction is executed in the neighborhood of the font and, when the write instruction is issued to the EMS window 41, the font stored in the expanded memory 33 is destroyed permanently. Even if, depending on applications, the temporal destruction of the contents of the buffer 212 may occur infrequently, fonts stored in the expanded memory 33 are never subjected to destruction.

In subsequent step 93, preparations are made for restoration of the expanded memory control information saved in step 90 and continuation of processing inclusive of the use of the expanded memory after return to the state and the program prior to the font pattern read command.

By executing the processing shown in FIG. 13 repeatedly on a character-by-character basis, more than one font pattern is read in sequence.

By the above processing, font patterns can be acquired without preventing the application from using the expanded memory. If the memory 40 has enough space, the Japanese emulator is permitted to have the font pattern cache facility to thereby reduce access to the expanded memory.

(3) Outputting of country identification information

The MS-DOS, the OS used in the embodiment of the present invention, has a function of informing an application of a country where the MS-DOS is to be used by returning a telephone country code from the MS-DOS to the application when the application issues a specific command. For example, "1" is returned in the case of the English MS-DOS for U.S.A., while "81" is returned in the case of the Japanese MS-DOS for Japan.

More specifically, the above-mentioned specific command executes a deduction and generates an interruption from a hardware standpoint. The interruption handling program checks additional information and sees that it is the country identification information requesting command. The program then reads country identification information and returns it to the application.

Some of applications run after checking the country identification information. Some applications include a function of using "$" and " " properly utilizing country identification information.

The foregoing points constitute the basic technique that the present invention employs but not a newly devised part of the present invention. They are well known to those skilled in the art.

The embodiment of the present invention employs applications prepared for the Japanese MS-DOS with the English MS-DOS. The emulator requires a function of returning the country identification information "81" in spite of the English MS-DOS. For this reason, the above-mentioned interruption causes the Japanese emulator 21 to operate when the Japanese emulator is operative. The Japanese emulator 21 checks attendant information and, when it is decided that the information is a country identification requesting command, the country identification driver 220 operates so as to return "81" to the application.

(4) Printer emulator

The printer emulator 215 supervises a request to the Japanese printer output from the application 32 and performs a process of converting the output to a request to the printer 36.

FIG. 14 is a flowchart illustrating the operation of the printer emulator. First, the printer emulator acquires data sent out from the application 32 in step 100. Next, a check is made in step 102 as to whether or not the data is a control code indicating the start of a command. When the data is not a control code, a check is made as to whether or not the current mode is the kanji mode, in step 102. When it is the kanji mode, second data needed for kanji is acquired in step 103. A kanji font pattern is acquired from the kanji code in step 104 and then saved in the image buffer in step 105.

When it is not the kanji mode, on the other hand, the data represents a character code that can be printed. That is, this is a case where half-size alpha-numeric characters are printed by the printer 36. When image data is saved, the image is output in step 106 and then a character code is output in step 107. When it is decided in step 101 that data is a control code, a check is made in step 108 as to whether or not the command is a print start command. In the case of the print start command, an image is output in step 109 if it is saved and then the print start command is output in step 110. When the command is not the print start command, on the other hand, internal processing, such as command conversion and kanji mode ON/OFF, is performed in step 111.

After the set of operations, return is made to step 100 and then a process of acquiring next data is carried out.

Figure 15B:
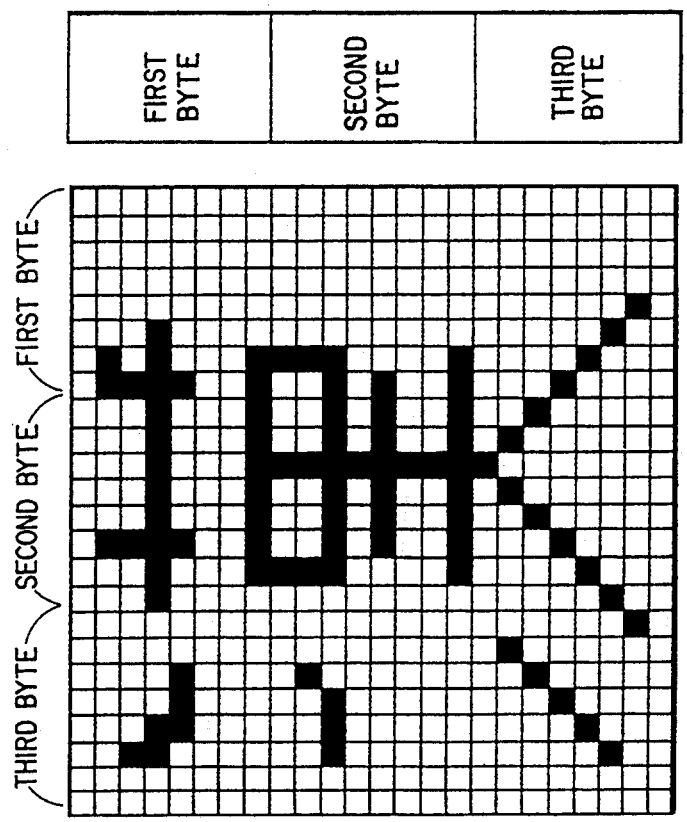
FIG. 15 illustrates a Kanji font pattern developed in an image buffer of the printer emulator of the present invention.
Figure 15A:
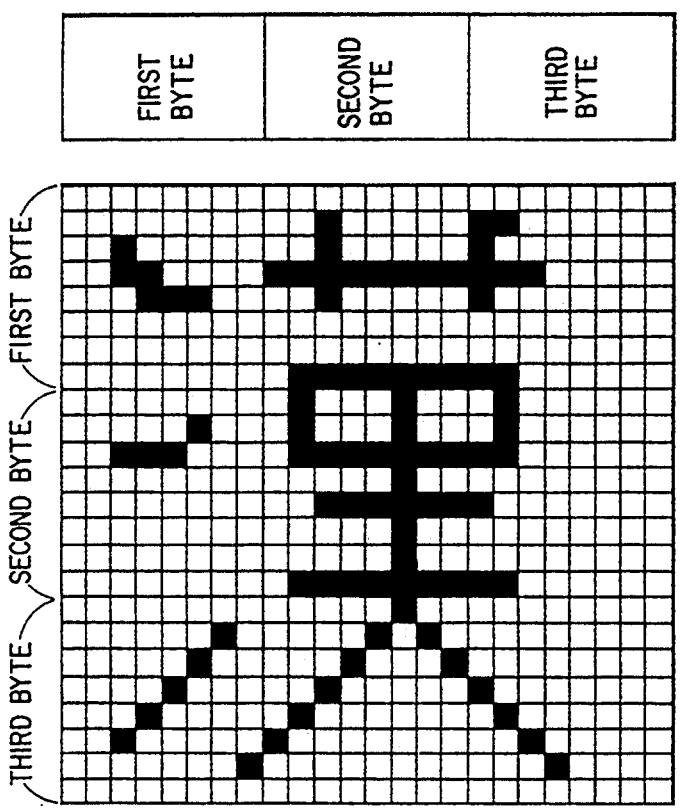

In the image buffer of the printer emulator 215, a kanji font pattern is stored turned by 90 degrees in advance as shown in FIG. 15. FIG. 15A shows a kanji font pattern stored in its rotated position for printing, while FIG. 15B shows a kanji font pattern stored in its normal position for display. Thus, pattern conversion does not need to be performed in reading a font pattern and the font pattern can be printed out easily. That is, where a font pattern composed of 24×24 dots (72 bytes) is stored in the same direction as a display font pattern, the font pattern needs to be converted to an output image of the printer 36. This is due to the fact that the scan direction of the display is horizontal, while the print direction of the printer is vertical. Thus, by storing font data as an output image in the vertical direction beforehand, printing can be performed without the pattern conversion process.

When a kanji font pattern received as an image is printed by the English printer 36, there is a possibility that part of the rightmost character is not printed. In the usual character print mode in which a character code is sent to a printer and converted to a font within the printer, a character overflowing one line to the right is fed to the next line. However, in the case where fonts are prepared by a computer and print patterns are sent to a printer, half of the rightmost character may not be printed even if automatic line feed is performed.

For this reason, the printer emulator 215 calculates a maximum number of characters per line and a character spacing and performs such control as to print characters on the next line when the maximum number of characters per line is exceeded.

FIG. 16 illustrates the storage state of the image buffer where up to 40 characters are printed at regular intervals by a printer having a maximum print width per line of 3840 bytes. In this example, one line is composed of (72+24)×40=3840 bytes with a character spacing of 24 bytes. When the character spacing cannot be set equally, quasi-equal spacing or adjustment of the rightmost space may be used. The printer is put into operation after character fonts have been embedded in the image buffer, thus preventing the rightmost character from being printed partially. Though, in the embodiment of the present invention, the English DOS was taken as an example of the OS, the present invention may be applied to other OSs than DOS, such as Windows, OS/2, etc., which have the DOS emulator facility. Moreover, though Japanese application software was taken as an example of application software, application software for other languages such as Chinese, Korean, etc. Furthermore, the hardware need not be limited to PC/AT compatibles.

With the development of the PC/AT compatibles, a new application interface including higher resolution image mode support may be defined. In this case, the application must be revised to fit the new interface.

In the above embodiment, description was given of an example in which an emulator was built in English-oriented hardware having no facility useful in handling Japanese. The purpose is to explain that the present invention can be carried out even by hardware with no Japanese facility. It does not mean that the present invention cannot be carried out by hardware having a Japanese facility. The present invention will be carried out more efficiently in the presence of a Japanese facility. This will be described below.

The description of FIGS. 3 through 11 and FIG. 12 can also be applied to hardware having a Japanese facility substantially as it is.

If a keyboard is equipped with keys unique to entry of Japanese, such as kana conversion and kanji conversion keys, then such a configuration as shown in FIG. 11 will become unnecessary. If keys are marked Japanese, not only Roman alphabet entry but also kana entry is permitted.

If Japanese character pattern information is prepared in a dedicated memory, the pattern information can directly be read from an emulator without the provision of the configuration of FIG. 13.

If a Japanese printer is prepared which contains Japanese character pattern information, the configurations of FIGS. 14 through 16 are unnecessary.

That is, if hardware having a Japanese facility is prepared, some configurations of the present invention become unnecessary, permitting higher performance processing. This does not change the essence of the present invention. By the configurations shown in FIGS. 3 through 12, an emulator and means for operating or stopping the emulator, a computer system can be realized which permits English application software and Japanese application software to be operated using one computer, one input/output device and one English OS.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A computer system comprising:
   an English language operating system;
   an English language basic input and output operating system for controlling operations of the English operating system and a plurality of input and output units in order to execute English language application software compatible with the English language operating system;
   an emulator for providing an interface between a non-English language application software and said English language operating system and an interface between said non-English language application software and said English language basic input and output operating system in order to execute said non-English Language application software;
   processor means for executing said English language operating system, said English language basic input and output operating system, said non-English language application software, and said emulator;
   wherein said emulator is loaded into and unloaded from memory storage means of said computer system independent from loading said English language operating system and said English language basic input/output control program from said memory storage means.

2. An emulator for operating Japanese application software using a processor, an input/output device and English operating system, comprising:

a keyboard driver program having a first process responsive to input information from a keyboard for decoding a Japanese entry and a second process for, as a result of the first process, outputting Japanese character information to Japanese application software;

Japanese character pattern information;

a display driver program having a third process responsive to a display command output from the Japanese application software for reading the Japanese character pattern information and a fourth process for displaying the Japanese character pattern information on a display device; and a printer driver program having a fifth process for outputting Japanese character information from the Japanese application software to a printer incompatible with said Japanese application software;

wherein said keyboard driver program, said display driver program, and said printer driver program are loaded into and unloaded from memory storage means of said computer system independent from loading said English operating system from said memory storage means.

3. A computer system comprising:

a processor;

an input unit;

an output unit;

memory storage means for storing
  a first language operating system,
  a second language application software compatible with a second language operating system,
  a first language basic input/output control program linked with said first language operating system, said processor, said input unit, and said output unit, and
  an emulator linked to said second language application software, said first language operating system, and said first language basic input/output control program for executing said second language application software, said emulator loaded into and unloaded from said memory storage means independent from loading said first language operating system and said first language basic input/output control program from said memory storage means; and means for activating and terminating said emulator.

4. A computer system according to claim 3, wherein the first language is English.

5. A computer system according to claim 3, wherein the second language is Japanese.

6. A computer system according to claim 3, wherein the first language is English and the second language is Japanese.

7. A computer system comprising:

a processor;

a keyboard;

a display unit;

memory storage means for storing
  a first language operating system,
  a second language application software compatible with a second language operating system,
  a first language basic input/output control program linked with said first language operating system, said processor, said keyboard, and said display unit, and
  an emulator linked to said second language application software, said first language operating system, and said first language basic input/output control program for executing said second language application software, said emulator loaded into and unloaded from said memory storage means independent from loading said first language operating system and said first language basic input/output control program from said memory storage means; and means for activating and terminating said emulator;

wherein said emulator includes
  second language character pattern data,
  a display driver program for supplying said second language character pattern data to said display unit, and
  a keyboard driver program for converting input data from said keyboard into second language character code data.

8. A computer system according to claim 7, wherein said means for activating and terminating said emulator comprises a supervising section that, responsive to a screen mode setting request made by application software, determines whether the application software is first language application software or said second language application software, terminates operation of the emulator when the application software is determined to be said first language application software, and activates the emulator when the application software is determined to be said second language application software.

9. A computer system according to claim 8, wherein said supervising section of said emulator detects a screen mode setting request unique to said second language application software to activate the emulator and detects the end of said second language application software to terminate the emulator.

10. A computer system according to claim 8, wherein said supervising section of said emulator detects a screen mode setting request unique to said first language application software to terminate the emulator and detects the end of said first language application software to activate the emulator.

11. A computer system according to claim 7, wherein said emulator further comprises a country identification driver program which, responsive to a country identification requesting command made by said second language application software, sends country identification information to said second language application software.

12. A computer system according to claim 11, wherein the country identification information is a telephone country code.

13. A computer system according to claim 7, wherein the first language is English.

14. A computer system according to claim 7, wherein the second language is Japanese.

15. A computer system according to claim 7, wherein the first language is English and the second language is Japanese.

16. A computer system according to claim 7, further comprising:

first means responsive to input information from the keyboard for controlling the keyboard driver program;

second means responsive to output from the keyboard driver program for controlling the second language application program;

third means responsive to a display command output from the second language application software for controlling the display driver program; and fourth means responsive to a second language character output from the display driver program for reading the second language character pattern data from the memory storage means and displaying the second language character pattern data on the display unit.

17. A computer system according to claim 7, the memory storage means comprising a main memory section and an expanded memory section, wherein said second language character pattern data of said emulator is stored in said expanded memory section of the expanded memory section including character pattern.

18. A computer system according to claim 7, wherein said loading of said emulator into said memory storage means and unloading of said emulator from said memory storage means is performed in response to a command of said first language operating system.

19. A computer system according to claim 7, wherein said activating and terminating of said emulator is performed in response to a command of said first language operating system.

20. A computer system according to claim 7, further comprising means for writing a start address into an interrupt vector address of said memory storage means to start said keyboard driver program of said emulator and to check whether a specific keyboard entry is present while said emulator is activated.

21. A computer system according to claim 7, further comprising means for reading one of a screen mode and an interrupt vector from a first address of said memory storage means and storing said one of said screen mode and interrupt vector in a second address of said memory storage means when said emulator is activated, and means for restoring said one of said screen mode and said interrupt vector to said first address of said memory storage means when said emulator is terminated.

22. A computer system comprising:
a processor;
a keyboard;
a display unit;
memory storage means for storing
an English language operating system,
a Japanese language application software compatible with a Japanese language operating system,
an English language basic input/output control program linked with said English language operating system, said processor, said keyboard, and said display unit, and
an emulator linked to said Japanese language application software, said English language operating system, and said English language basic input/output control program for executing said Japanese language application software, said emulator loaded into and unloaded from said memory storage means independent from loading said English language operating system and said English language basic input/output control program from said memory storage means;
means for activating and terminating said emulator; and
a printer incompatible with said Japanese language application software;
wherein said emulator included
Japanese language character pattern data,
a display driver program for supplying said Japanese language character pattern data to said display unit,
a keyboard driver program for converting input data from said keyboard into Japanese language character code data, and
a printer emulator for storing said Japanese language character pattern data in said memory storage means for outputting to said printer; and
wherein said computer system further comprises
first means responsive to input information from said keyboard for controlling said keyboard driver program,
second means responsive to Japanese language character code data output from said keyboard driver program for controlling said Japanese language application software,
third means responsive to a display command output from said Japanese language application software for controlling said display driver program,
fourth means responsive to a Japanese language character output from said display driver program for reading said Japanese language character pattern data from said memory storage means and displaying said Japanese language character pattern data on the display unit,
fifth means for selectively coupling Japanese language character pattern data stored in said memory storage means to form print pattern information, and
sixth means for outputting said print pattern information to said printer for printing.

23. A computer system according to claim 22, wherein Japanese language character pattern data stored in said memory storage means for printing is turned 90 degrees with relation to Japanese language character pattern data concurrently stored in said memory storage means for display.

24. A computer system according to claim 22, wherein said printer emulator includes an image buffer for storing said Japanese language character pattern data, said image buffer having a capacity corresponding to a maximum print width, wherein said printer emulator writes Japanese language character pattern data into said image buffer prior to said seventh means outputting Japanese language character pattern data stored in said image buffer to said printer for printing.

25. A computer system comprising:
a processor;
a keyboard;
a display unit;
memory storage means for storing
an English language operating system,
a Japanese language application software compatible with a Japanese language operating system,
an English language basic input/output control program linked with said English language operating system, said processor, said keyboard, and said display unit, and
an emulator linked to said Japanese language application software, said English language operating system, and said English language basic input/output control program for executing said Japanese language application software, said emulator loaded into and unloaded from said memory storage means independent from loading said English language operating system and said English language basic input/output control program from said memory storage means; and means for activating and terminating said emulator; wherein said emulator includes Japanese language character pattern data, a display driver program for supplying said Japanese language character pattern data to said display unit, and a keyboard driver program for converting input data from said keyboard into Japanese language character code data; and wherein said computer system further comprises first means responsive to input information from said keyboard for controlling said keyboard driver program, second means responsive to Japanese language character code data output from said keyboard driver program for controlling said Japanese language application software, third means responsive to a display command output from said Japanese language application software for controlling said display driver program, and fourth means responsive to a Japanese language character output from said display driver program for reading said Japanese language character pattern data from said memory storage means and displaying said Japanese language character pattern data on said display unit.

26. A computer system according to claim 25, wherein said keyboard driver program performs one of kana conversion and kanji conversion when a key that is seldom used by any Japanese language application software is activated or when a combination of said key and another key is activated.

27. In a computer system including a processor, an input device, an output display, a printer, a printer driver for outputting data to said printer, an expanded memory for storing print pattern data corresponding to associated second language character print data, and a main memory for storing a first operating system, an expanded memory window for accessing said expanded memory, and an image buffer, an emulation method for controlling said processor to execute a second application program which is compatible with a second operating system under said first operating system, said method comprising the steps of:

(a) controlling said processor to receive said second language print data from said second application, (b) controlling said processor to determine whether said second language print data is a "start of command" control code, (c) upon determining that said second language print data is not said "start of command" control code in step (b), controlling said processor to determine whether said second language print data is a first mode indicator, (d) upon determining that said second language print data is said first mode indicator in step (c), controlling said processor to receive said second language print data from said second application software, (e) responsive to step (d), controlling said processor to obtain said print pattern data corresponding to said second language character print data from said expanded memory, (f) responsive to step (e), controlling said processor to save said print pattern data obtained in step (e) into said image buffer, (g) upon determining that said second language print data is not said first mode indicator in step (c), controlling said processor to output said image buffer to said printer driver, (h) responsive to step (g), controlling said processor to output a character code to said printer driver, (i) upon determining that said second language print data is a "start of command" control code in step (b), controlling said processor to determine whether said "start of command" control code is a print start command, (k) upon determining that said "start of command" control code is said print start command in step (i), controlling said processor to output said image buffer to said printer driver, (l) responsive to step (k), controlling said processor to output said print start command to said printer driver.

28. The emulation method according to claim 27:

wherein said first language operating system comprises English DOS and English BIOS, and wherein said second language operating system comprises Japanese DOS and Japanese BIOS, and said first mode indicator is a kanji mode indicator.

29. The emulation method according to claim 28, wherein steps (a)–(i) are performed by a loadable resident program, wherein said resident program is loaded by the steps of:

(i) saving a current screen mode into said main memory, (ii) loading kanji display pattern data and print pattern data into expanded memory, (iii) saving interrupt vector and DOS device driver information into said main memory, (iv) setting said interrupt vector and said DOS device driver to point to said resident program, (v) setting said output display to a Japanese mode, and (vi) loading said resident program into said main memory.

30. The emulation method according to claim 29, wherein said resident program is unloaded by the steps of:

(A) restoring said interrupt vector and DOS device driver information saved in step (iii), (B) setting said output display to the screen mode saved in step (i).

31. The emulation method according to claim 31, wherein said input device is a keyboard and said output display is a video display.

32. The emulation method according to claim 31, wherein step (a) comprises the following steps:

(i) determining whether a kana key has been pressed on said keyboard, (ii) determining whether a kanji conversion key has been pressed on said keyboard, (iii) inputting a kana character entered on said keyboard into said second application program responsive to said kana key being pressed in step (i)

(iv) inputting a kanji character entered on said keyboard through kana-to-kanji or Roman-alphabet-to-kanji conversion into said second application program responsive to said kanji conversion key being pressed in step (ii).

33. The emulation method according to claim 32:

wherein said kana key comprises a SCROLL LOCK key of said keyboard, and wherein said kanji conversion key comprises said SCROLL LOCK key of said keyboard shifted with an ALT key of said keyboard.

34. The emulation method according to claim 28, wherein said second language operating system further comprises English BIOS.

35. The emulation method according to claim 27:
wherein said first language operating system is English DOS, and
wherein said second language operating system is Japanese DOS, and said first mode indicator is a kanji mode indicator.

36. In a computer system including a processor and a main memory for storing a first operating system, a method for controlling said processor to activate and terminate an emulator for executing a second application program which is compatible with a second operating system under said first operating system, said method comprising the steps of:
(a) controlling said processor to receive a display request from said second application program,
(b) responsive to step (a), controlling said processor to determine whether said display request is a request to set the mode of said output display to a first mode,
(c) upon determining that said display request is said request to set the mode of said output display to said first mode in step (b), controlling said processor to determine whether said mode of said output display is currently said first mode
(d) upon determining that said mode of said output display is not currently said first mode in step (c), controlling said processor to activate said emulator
(e) responsive to step (d), controlling said processor to set said mode of said output display to said first mode,
(f) upon determining that said display request is not said request to set the mode of said output display to said first mode in step (b), controlling said processor to determine whether said mode of said output display is currently a second mode
(g) upon determining that said mode of said output display is currently not said second mode in step (f), controlling said processor to terminate said emulator.

37. The method according to claim 36, wherein said first mode is a Japanese mode and said second mode is an English mode.

38. In a computer system including a processor, an input device, an output display, an expanded memory for storing display pattern data corresponding to associated second language character display data, and a main memory for storing a first operating system, an expanded memory window for accessing said expanded memory, and a memory buffer, an emulation method for controlling said processor to execute a second application program which is compatible with a second operating system under said first operating system, said method comprising the steps of:
(a) controlling said processor to receive said second language display data from said second application program;
(b) controlling said processor to store control information associated with said expanded memory into said main memory;
(c) controlling said processor to determine the location within said expanded memory of said display pattern data corresponding to said second language character display data,
(d) controlling said processor to map said location into said expanded memory window,
(e) controlling said processor to copy said expanded memory window into said memory buffer,
(f) controlling said processor to output said display pattern data to said output display, and
(g) controlling said processor to restore said control information saved in step (b).

39. The emulation method according to claim 38, wherein said expanded memory stores print pattern data corresponding to associated second language character print data, wherein said display pattern data and said print pattern data. consist of at least one two-dimensional font pattern.

40. The emulation method according to claim 39, wherein each two-dimensional font pattern associated with said print pattern data is rotated 90 degrees from each two-dimensional font pattern associated with said display pattern data.

41. The emulation method according to claim 38, wherein said display pattern data and said print pattern data consist of at least one 72-byte two-dimensional font pattern composed of 24 by 24 dots.

42. The emulation method according to claim 41, wherein step (b) outputs each 72-byte two-dimensional font pattern with a 24-byte space between each pattern.

43. In a computer system for executing a first language operating system, an emulation method for executing a second language application program under said first language operating system, wherein said second language application program is compatible with a second language operating system and wherein said computer system includes an input device and an output device, said emulation method comprising the steps of:
(a) booting said computer system with said first language operating system,
(b) loading an emulator for adapting said input device and said output device for use with said second language application program independent from loading said first language operating system
(c) executing said second application program, and
(d) unloading said emulator loaded in step (b).

44. A computer system including an input device, an output display, and a main memory, comprising:
a first language operating system stored in said main memory,
a second language application program stored in said main memory, wherein said second application program is compatible with a second language operating system, and wherein said second language application program receives input from said input device and outputs to said output display, and
an emulator for executing said second language application program under said first language operating system, said emulator loaded into and unloaded from said main memory independent from loading and unloading said first language operating system from said main memory.

45. The computer system according to claim 44, wherein said emulator comprises:
a first driver for converting first language character data received from said input device into second language character input data, and for inputting said second language character input data into said second language application program, and a second driver for converting second language character display data received from said second language application program into display pattern data associated with said second language character display data and for outputting said display pattern data to said output display.

46. The computer system according to claim 45, wherein said display pattern data is loaded into an expanded memory.

47. The computer system according to claim 46, wherein said second driver includes a buffer area for loading said display pattern data.

48. The computer system according to claim 45, wherein said first driver is loaded into said main memory.

49. The computer system according to claim 44, further comprising:
- a printer compatible with said first language operating system,
- a printer driver for outputting data to said printer,
- a printer emulator for converting second language character print data received from said second language application program into print pattern data associated with said second language character print data and for outputting said print pattern data to said printer driver.

50. The computer system according to claim 49, further comprising:
- an expanded memory for storing font pattern data,
- an expanded memory system window for loading selected portions of said expanded memory, wherein said emulator outputs font pattern data corresponding to character data received from said second language application program to said output display, and wherein said printer emulator outputs font pattern data corresponding to character data received from said second language application program to said printer.

51. The computer system according to claim 49, wherein said display pattern data and said print pattern data consist of at least one two-dimensional font pattern.

52. The computer system according to claim 51, wherein each two-dimensional font pattern associated with said print pattern data is rotated 90 degrees from each two-dimensional font pattern associated with said display pattern data.

53. The computer system according to claim 49, wherein said display pattern data and said print pattern data consist of at least one 72-byte two-dimensional font pattern composed of 24 by 24 dots.

54. The computer system according to claim 53, wherein each 72-byte two-dimensional font pattern is output to said printer driver with a 24-byte space between each pattern.

55. The computer system according to claim 49:
- wherein said first language operating system is English DOS, and
- wherein said second language operating system is Japanese DOS.

56. The computer system according to claim 49:
- wherein said first language operating system comprises English DOS and English BIOS, and
- wherein said second language operating system comprises Japanese DOS and Japanese BIOS.

57. The computer system according to claim 56, wherein said second language operating system further comprises English BIOS.

58. The computer system according to claim 50, wherein said input device is a keyboard and said output display is a video display.

59. The computer system according to claim 50, further comprising:
- a communication unit,
- a communication driver for providing an interface between said second language application program and said communication unit compatible with said second language operating system,
- a timer,
- a timer driver for providing an interface between said second language application program and said timer compatible with said second language operating system,
- an expanded memory,
- an expanded memory manager for managing said expanded memory,
- a second language expanded memory driver for providing an interface between said second language application program and said expanded memory manager compatible with said second language operating system, and
- a country identification driver for providing country information to said second language application program corresponding to said second language operating system.

60. An emulator for use with a computer system including an input device, an output display, a main memory, a first language operating system stored in said main memory, and a second language application program stored in said main memory and compatible with a second language operating system, wherein said second language application program receives input from said input device and outputting to said output display, said emulator comprising:
- a first driver for converting first language character data received from said input device into second language character input data, and for inputting said second language character input data into said second language application program, and
- a second driver for converting second language character display data received from said second language application program into display pattern data associated with said second language character display data and for outputting said display pattern data to said output display,
- wherein said first and second drivers are loaded into and unloaded from said main memory independent from loading said first language operating system from said main memory.

61. The emulator according to claim 60, wherein said display pattern data is loaded into an expanded memory.

62. The emulator according to claim 61, wherein said second driver includes a buffer area for loading said display pattern data.

63. The emulator according to claim 60, wherein said computer system further includes a printer compatible with said first language operating system and a printer driver for outputting data to said printer, said emulator further comprising:
- a printer emulator for converting second language character print data received from said second language application program into print pattern data associated with said second language character print data and for outputting said print pattern data to said printer driver, said printer emulator loaded into and unloaded from said main memory independent from loading said first language operating system from said main memory.

64. The emulator according to claim 63, wherein said display pattern data and said print pattern data consist of at least one two-dimensional font pattern.

65. The emulator according to claim 64, wherein each two-dimensional font pattern associated with said print pattern data is rotated 90 degrees from each two-dimensional font pattern associated with said display pattern data.

66. The emulator according to claim 63, wherein said display pattern data and said print pattern data consist of at least one 72-byte two-dimensional font pattern composed of 24 by 24 dots.

67. The emulator according to claim 66, wherein each 72-byte two-dimensional font pattern is output to said printer driver with a 24-byte space between each pattern.

68. The emulator according to claim 63:
wherein said first language operating system comprises English DOS and English BIOS, and
wherein said second language operating system comprises Japanese DOS and Japanese BIOS.

69. The emulator according to claim 68, wherein said second language operating system further comprises English BIOS.

70. The emulator according to claim 63:
wherein said first language operating system is English DOS, and
wherein said second language operating system is Japanese DOS.

71. The emulator according to claim 63, wherein said input device is a keyboard and said output display is a video display.

72. The emulator according to claim 63, wherein said computer system further comprises a communication unit, a timer, an expanded memory, an expanded memory manager for managing said expanded memory, further comprising:
a communication driver for providing an interface between said second language application program and said communication unit compatible with said second language operating system,
a timer driver for providing an interface between said second language application program and said timer compatible with said second language operating system,
a second language expanded memory driver for providing an interface between said second language application program and said expanded memory manager compatible with said second language operating system, and
a country identification driver for providing country information to said second application program corresponding to said second language operating system.

73. The emulator according to claim 63, wherein said computer system further comprises an expanded memory for storing font pattern data, further comprising:
an expanded memory system window for loading selected portions of said expanded memory, wherein said emulator outputs font pattern data corresponding to character data received from said second language application program to said output display, and wherein said printer emulator outputs font pattern data corresponding to character data received from said second language application program to said printer.

* * * * *